United States Patent
Bondi et al.

[19]

[11] Patent Number: 5,958,046
[45] Date of Patent: Sep. 28, 1999

[54] MICROPROCESSOR WITH REDUCED MICROCODE SPACE REQUIREMENTS DUE TO IMPROVED BRANCH TARGET MICROADDRESS CIRCUITS, SYSTEMS, AND METHODS

[75] Inventors: James O. Bondi; Jonathan H. Shiell, both of Plano, Tex.

[73] Assignee: Texas Instruments Incorporated, Dallas, Tex.

[21] Appl. No.: 08/756,422

[22] Filed: Nov. 26, 1996

[51] Int. Cl.[6] .................................................. G06F 9/00
[52] U.S. Cl. ........................ 712/230; 712/245; 712/234
[58] Field of Search ................................... 395/571, 595, 395/387, 581, 590

[56] References Cited

U.S. PATENT DOCUMENTS

| 3,794,979 | 2/1974 | McMahon | 395/567 |
|---|---|---|---|
| 4,392,198 | 7/1983 | Shimazaki | 395/571 |
| 4,394,735 | 7/1983 | Satoh et al. | 395/571 |
| 4,546,431 | 10/1985 | Hovath | 395/590 |
| 5,046,040 | 9/1991 | Miyoshi | 395/571 |
| 5,077,659 | 12/1991 | Nagata | 395/386 |
| 5,210,833 | 5/1993 | Kaneko | 395/583 |
| 5,241,547 | 8/1993 | Kim | 714/803 |
| 5,321,821 | 6/1994 | Itomitsu et al. | 395/386 |
| 5,479,620 | 12/1995 | Kiyohara et al. | 395/567 |
| 5,636,374 | 6/1997 | Rodgers et al. | 395/571 |
| 5,794,026 | 8/1998 | Hervin et al. | 395/583 |

*Primary Examiner*—Zarni Maung
*Attorney, Agent, or Firm*—Rebecca Mapstone Lake; Richard L. Donaldson

[57] ABSTRACT

A circuit (10) for producing a microprogram memory address (16). This circuit includes circuitry (18I, 18J) for selecting a plurality of condition codes. Additionally, the circuit includes logic circuitry (20) for producing a result by performing logic operations using as operands the selected plurality of condition codes. The result of the logic operations forms a first portion (LSB', or LSB' and NLSB') of the microprogram memory address.

38 Claims, 3 Drawing Sheets

MICROPROCESSOR WITH REDUCED MICROCODE SPACE REQUIREMENTS DUE TO IMPROVED BRANCH TARGET MICROADDRESS CIRCUITS, SYSTEMS, AND METHODS

TECHNICAL FIELD OF THE INVENTION

The present embodiments relate to microprocessors, and are more particularly directed to a microprocessor with reduced microcode space requirements due to improved branch target microaddress circuits, systems, and methods.

BACKGROUND OF THE INVENTION

The embodiments described below involve the developing and ever-expanding field of computer systems and microprocessors. As these fields advance, considerations of efficiencies bear on all aspects of operation and design. One key example of such considerations is device size. Another area is efficiency of microcode. These examples are just some of those which are addressed by the embodiments set forth below. Particularly, these embodiments are directed in many respects to the microprogram memory, which typically in the art is a read only memory referred to as the microROM. The microprogram memory is a fundamental unit of the microprocessor which receives a "microaddress" and, in response, outputs a "microinstruction." The microinstruction is a multiple bit signal, and the value of most if not all of those bits is used to control some aspect of the microprocessor. For example, in horizontal always-branch microprocessors, each microinstruction includes at least one microaddress of the next potential microinstruction to be output by the microprogram memory. As detailed below, microprocessor systems using such a microprogram memory are improved upon by the following embodiments.

In prior art horizontal always-branch microprocessors, the microaddress included within the microinstruction includes three parts: (1) a least significant bit; (2) a next-to-least significant bit; and (3) a main portion. Each of these three portions is concatenated to create the next microaddress for an unconditional branch. In other words, the next microaddress for an unconditional branch is created as shown diagrammatically below:

|main portion|next-to-least significant bit|least significant bit|

In contrast, the next microaddress for a prior art 4-way conditional branch is created by concatenating the main portion with the applicable condition codes and, therefore, the next-to-least significant bit and the least significant from the preceding microinstruction are disregarded. Particularly, the applicable condition codes are substituted in place of the next-to-least significant bit and the least significant and, thus the next microaddress for a conditional branch is:

|main portion|condition code J|condition code I| where "I" and "J" are shown to indicate any given two different condition codes. Thus, the microaddress of the next (or "target") microinstruction depends upon the particular binary values of condition codes I and J.

To implement the above, the prior art hardware configuration for creating a 4-way conditional branch microaddress merely receives the above information, and directly outputs it in the above format. In other words, the values of the condition codes are directly injected into the last two bits of the next microaddress. As a result, for a conditional branch based on two condition codes, there exists the possibility of four different microaddresses. Shown diagrammatically, these microaddresses are:

|main portion|0|0|
|main portion|0|1|
|main portion|1|0|
|main portion|1|1|

Further, because of the possibility of four different microaddresses, the prior art microprogram memory necessarily includes four different target microinstructions, that is, one for each of the corresponding microaddresses. Still further, the above describes the instance of a 4-way conditional branch, while it should be noted that various prior art architectures operate in the same manner for conditional branches greater than four, such as an 8-way, 16-way, or even greater conditional branch scenario. In each instance, the prior art microprogram memory necessarily includes a sufficient number of different target microinstructions to accommodate each of the ways (e.g., 8,16, or more) in which the branch can occur.

As detailed below, the inventors of the present embodiments now appreciate various inefficiencies in the above approach including unnecessarily duplicated microinstructions. Therefore, there arises a need to address the drawbacks of current processors, particularly in view of these as well as other inefficiencies.

SUMMARY OF THE INVENTION

In one embodiment, there is disclosed a circuit for producing a microprogram memory address. This circuit includes circuitry for selecting a plurality of condition codes. Additionally, the circuit includes logic circuitry for producing a result by performing logic operations using as operands the selected plurality of condition codes. The result of the logic operations forms a first portion of the microprogram memory address. Other aspects including circuits, systems, and methods are also disclosed and claimed.

DETAILED DESCRIPTION OF THE PREFERRED EMBODIMENTS

The inventors of the present embodiments have recognized that in many instances the above-described use of microprogram memory locations is wasteful. Particularly, the present inventors have observed that in various circumstances the combination of two different condition codes may not require one of four different actions, that is, a first combination of those codes may actually require the same next action as a second combination of those codes. For example, if the combination of two particular condition codes gives rise to only two different actions, then the embodiments described below strive to address only two microinstructions, where each is stored only once in the microprogram memory. In contrast, the prior art duplicated both of those two different microinstructions in the microprogram memory, thereby using four different microprogram memory locations where it is now discovered that only two are necessary. As another example, if the combination of two particular condition codes gives rise to three different actions, then the embodiments described below strive to address only three microinstructions, where each is stored only once in the microprogram memory. In contrast, the prior art duplicated one of these three different microinstructions in the microprogram memory, again using four different microprogram memory locations where it is now discovered that only three are necessary.

Figure 1:
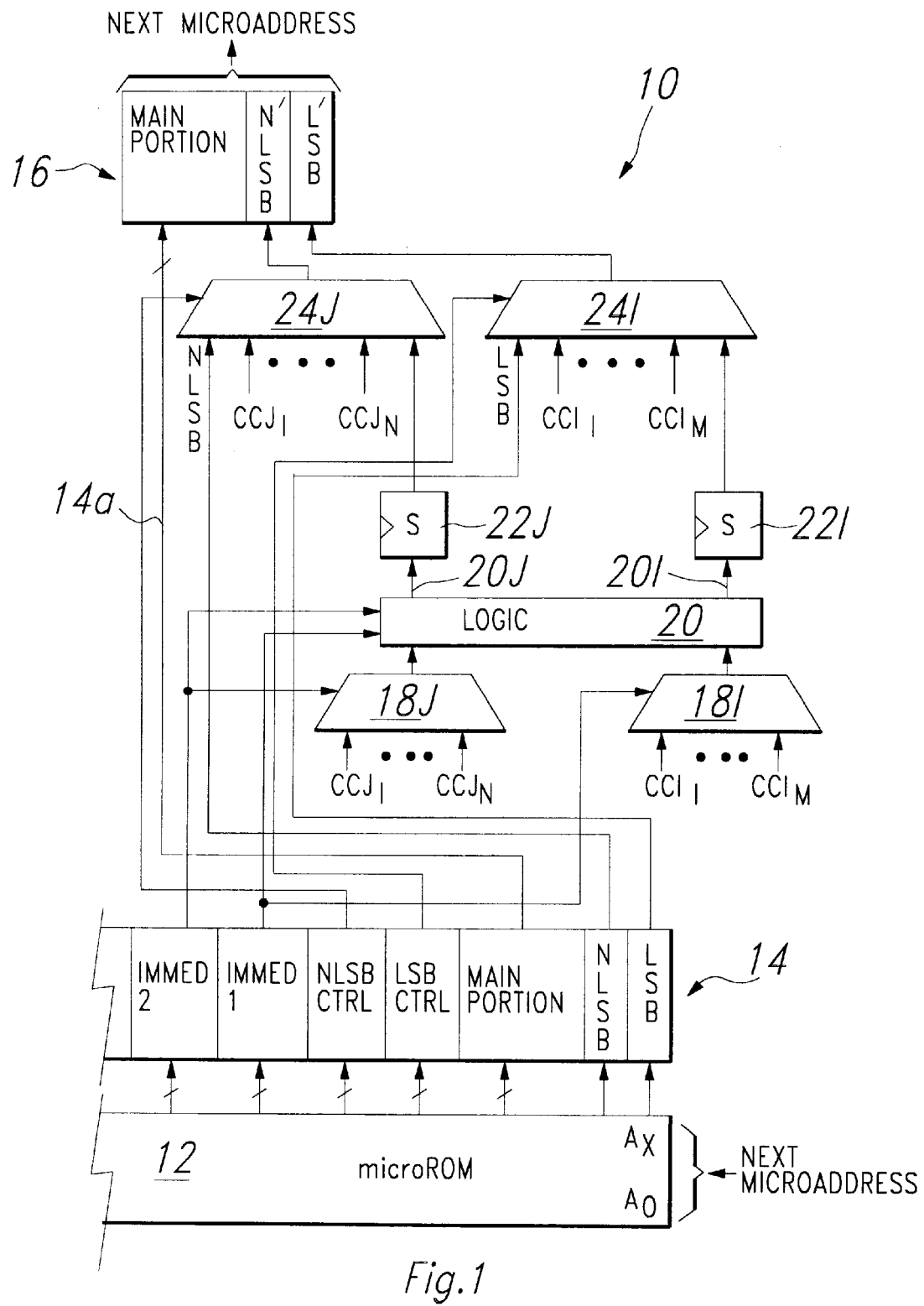
FIG. 1 illustrates a schematic of a microaddress producing system.

FIG. 1 illustrates a schematic of a microaddress producing system designated generally at 10. System 10 includes a microprogram memory which is shown as a microROM 12 and which outputs a microinstruction designated generally at 14. Note that microprogram memory is illustrated as a read only memory by way only of example, and various other storage circuits could be used, such as random access memories, PLAs, or other storage circuits developed by a person skilled in the art. Microinstruction 14 typically includes various information to control many different aspects of processor information. However, for purposes of the present embodiments, the following discussion focuses on those portions of microinstruction 14 which are used to create the next microaddress designated generally at 16. Once next microaddress 16 is generated, it is then applied to the address inputs of microROM 12, designated $A_0$ through $A_x$, to address the next microinstruction. The process repeats in this manner to successively generate microaddresses and to successively cause microROM 12 to output a corresponding microinstruction.

Microinstruction 14 is preferably on the order of sixty-four bits, but for purposes of the present embodiment only selected ones of those bits need be shown and discussed. Particularly, the illustrated portions of microinstruction 14 include: (1) the least significant bit ("LSB"); (2) the next-to-least significant bit ("NLSB"); (3) the microaddress main portion ("main portion"); (4) an LSB control field; (5) an NLSB control field; (6) an immediate field #1; and (7) an immediate field #2. The purpose of each of these fields is better understood with reference to the detailed discussion below. At this point, note that the LSB, the NLSB, and the main portion combine to form next microaddress 16 for an unconditional branch microinstruction; however, for 4-way conditional branch microinstructions, only the main portion of microinstruction 14 passes directly to next microaddress 16 via a bus 14a, while the remainder of next microaddress 16 is generated from the additional items shown in FIG. 1 and detailed below. To simplify the discussion, the latter bits of next microaddress 16 are depicted as LSB' and NLSB', such that the apostrophe associates those bits with next microaddress 16 rather than microinstruction 14.

System 10 includes a pair of multiplexers 18I and 18J, each connected in a comparable manner. Before discussing the connections of these multiplexers, note generally that multiplexer 18I is connected in a data path to potentially affect the value of LSB', while multiplexer 18J is connected in a data path to potentially affect the value of NLSB'. Turning then to multiplexer 18I, it receives as its inputs a number, M, of condition codes designated generally as $CCI_1$ through $CCI_M$. Each of condition codes $CCI_1$ through $CCI_M$ depicts any type of single bit code representative of a changeable condition, such as a sign bit, a zero bit, or any other bit controlled either by hardware or software. Further, certain ones of condition codes $CCI_1$ through $CCI_M$ may be connected to multiplexer 18I via storage devices such as latches and, thus, for purposes of illustration, condition code $CCI_1$ is shown as connected in this manner (with it understood that condition codes other than, or in addition to, $CCI_1$ could be connected to multiplexer 18I in like manner). In all events, the value of one or more of these conditions affects the next desired microinstruction and, therefore, affects the value of the next desired microaddress. The output of multiplexer 18I is connected to an input of a logic circuit 20. The control input of multiplexer 18I is connected to immediate field #1 of microinstruction 14. As mentioned above, multiplexer 18J is connected in a manner comparable to multiplexer 18I. Thus, multiplexer 18J receives as its inputs a number, N, of condition codes designated generally as $CCJ_1$ through $CCJ_N$ (again, some of which may be connected through respective storage devices as illustrated by way of example for $CCJ_N$). Like $CCI_1$ through $CCI_M$, $CCJ_1$ through $CCJ_N$ also depict any type of single bit code representative of a changeable condition. The output of multiplexer 18J is connected to an input of logic circuit 20. The control input of multiplexer 18J is connected to immediate field #2 of microinstruction 14.

Logic circuit 20 represents a circuit or circuits operable to perform various logic operations on its two inputs (from multiplexers 18I and 18J), such as known Boolean operations well known in the art. The particular circuitry for such a logic circuit is not critical, so long as the circuit is capable of performing various logic functions to accomplish the operations described below. A person skilled in the art has ready access to various resources to construct such a circuit. For example, the book entitled *Introduction To VLSI Design*, published by McGraw Hill Publishing Company in 1990, depicts at pages 169–175, a circuit operable to perform each of the AND, NAND, OR, NOR, XOR, and XNOR functions with a straightforward nine transistor circuit. Such an illustration is hereby incorporated herein by reference. Logic circuit 20 outputs two one bit values, via respective outputs 20I and 20J, to respective storage devices 22I and 22J. In the preferred embodiment, storage devices 22I and 22J are latches clocked by some system clock or the like (not shown for purposes of simplifying the illustration). Further, since system 10 may already include storage devices for receiving certain condition codes (such as $CCI_1$ and $CCJ_1$ in the present example), these storage devices are easily expanded in only slight fashion to further accommodate the outputs of logic circuit 20. The outputs of storage devices 22I and 22J are connected to respective inputs of multiplexers 24I and 24J.

Multiplexers 24I and 24 output respective values to LSB' and NLSB'. Particularly, multiplexer 24I selects its output from one of its inputs, which includes the output of storage device 22I, any of condition codes $CCI_1$ through $CCI_M$, and the value of LSB received from microinstruction 14. Similarly, multiplexer 24J selects its output from one of its inputs, which includes the output of storage device 22J, any of condition codes $CCJ_1$ through $CCJ_N$, and the value of NLSB received from microinstruction 14.

The operation of system 10 for an unconditional branch is as follows. Recall from above that, when an unconditional branch microinstruction is output as microinstruction 14, the LSB, the NLSB, and the main portion combine to form next microaddress 16. With reference now to the relevant components for accomplishing these actions, when microinstruction 14 is an unconditional branch, the LSB and NLSB control fields cause multiplexers 24I and 24J to select the LSB and NLSB bits directly from microinstruction 14. Thus, these bits are output and become the LSB' and NLSB' bits for next microaddress 16. Moreover, the main portion passes from microinstruction 14, via bus 14a, to the main portion of next microaddress 16.

The operation of system 10 for a conditional branch is somewhat more complex, and is best explained by first appreciating the overall effect of the various multiplexers and logic circuit 20 when generating next microaddress 16.

Before discussing that effect, recall from above that the prior art merely concatenates the values of the condition codes, such as CCI and CCJ, with the main portion to form the next microaddress, and recall further that the present inventors recognized the inefficiencies of such an approach. In sharp contrast, the embodiments described in this document accomplish a conditional branch by performing logic operations using the appropriate condition codes as operands, and then combining the results of those logic operations with the main portion to form next microaddress 16. The specific operations of the components of FIG. 1 are better understood by first evaluating the following examples.

A first example demonstrates the operation of system 10 in connection with what the prior art treated as a 4-way branch microinstruction, but what reduces under the present embodiment to a 2-way branch microinstruction. Recall from the earlier discussion that under the prior art, and for a conditional branch based on two condition codes (e.g., CCI and CCJ), there existed four different microaddresses due to the injection of the condition codes directly into the next microaddress. However, assume for the present example that only two target microinstructions are desired based on those two condition codes. Table 1 below depicts such an example:

TABLE 1

| Condition Code Alternative | Condition Code CCJ, CCI | Branch target microinstruction |
|---|---|---|
| 1 | 0,0 | A |
| 2 | 0,1 | B |
| 3 | 1,0 | B |
| 4 | 1,1 | A |

The convention of Table 1 indicates that alternatives 1 and 4 both require a first branch target microinstruction (labeled arbitrarily as "A"), and alternatives 2 and 3 both require a second branch target microinstruction (labeled arbitrarily as "B"). In the prior art, therefore, there are two microaddresses for target microinstruction A, and two microaddresses for target microinstruction B. Thus, a total of four microaddresses are required and, moreover, a total of four prior art locations are consumed in the microROM. However, under the embodiment of FIG. 1 and as detailed below, system 10 reduces or "folds" the example of Table 1 to only two microaddresses, thereby consuming a total of only two microROM locations to accomplish the addressing for the illustrated condition codes. Consequently, there is a fifty percent reduction in microROM requirements over the prior art. In a microprocessor where such a reduction is implemented for numerous condition codes, one skilled in the art will appreciate that the microROM is significantly reduced in size.

The specific operation of system 10 to accomplish the above-described reduction is first explained below with reference to Table 2, and then detailed in connection with the actual components shown in FIG. 1. Because it is ascertainable from Table 1 that only two target microinstructions are required for the current example, then it is likewise concluded under the present embodiment that only two corresponding microaddresses are required as well. Moreover, because only two corresponding microaddresses are required, it is necessary to generate only one additional bit (i.e., because $2^1=2$ microinstructions), rather than using both condition code bits, to address the alternative two corresponding microaddresses. Given this conclusion, one skilled in the art need only identify the appropriate logic operation(s) on the condition codes at issue to create one controlling bit to address the total of two different desirable microinstructions. In the example of Table 1, therefore, one skilled in the art will conclude that the XOR operation accomplishes this purpose. Particularly, this operation results in the single bit as shown in Table 2:

TABLE 2

| Condition Code CCJ, CCI | CCJ XOR CCI | Branch target microinstruction |
|---|---|---|
| 0,0 | 0 | A |
| 0,1 | 1 | B |
| 1,0 | 1 | B |
| 1,1 | 0 | A |

The second and third columns of Table 2 demonstrate that a single unique bit can be formed by performing the XOR function between the condition codes, and the result of that operation uniquely corresponds to either of the desirable branch target microinstructions. As described immediately below, therefore, system 10 operates to generate this unique bit preferably as the least significant bit of the next microaddress.

Returning to FIG. 1, and considering the example of Tables 1 and 2, above, the generation of next microaddress 16 is as follows. First, the main portion from microinstruction 14 passes via bus 14*a* to next microaddress 16 in the same manner as in the case of an unconditional branch. Regarding the condition codes, immediate fields #1 and #2 of microinstruction 14 are established to cause multiplexers 18I and 18J to select the appropriate condition codes for the current microinstruction. Assume, therefore, that multiplexer 18I selects $CCI_1$ while multiplexer 18J selects $CCJ_1$, and that the values of these condition codes correspond to the above Tables. Next, multiplexers 18I and 18J output the selected condition codes to logic circuit 20. Logic circuit 20 also receives bits from the immediate fields #1 and #2 which indicate to logic circuit 20 which two condition codes are selected as operands for logic circuit 20; from this information, logic circuit 20 determines the necessary logic operation to be performed. In the current example, therefore, logic circuit 20 decodes that, for $CCI_1$ and $CCJ_1$, the XOR function is required. Thus, logic circuit 20 performs the XOR operation on its operands as shown in Table 2. The result of the XOR operation is output via output 20I to storage device 22I. Next, the LSB and NLSB control fields of microinstruction 14 control multiplexers 24I and 24J, respectively, to appropriately select the values for LSB' and NLSB'. The LSB control field causes multiplexer 24I to select the value from storage device 22I and, therefore, the result of the XOR operation is coupled to LSB' of next microaddress 16. In contrast, the NLSB control field causes multiplexer 24J to select the NLSB bit from microinstruction 14 and, therefore, this bit is coupled to NLSB' of next microaddress 16. Note with respect to the operation of multiplexer 24J that it could output either a logic 0 or a logic 1 instead of specifically selecting the NLSB bit. For example, logic circuit 20 could output such a pre-designated bit to storage device 22J, and multiplexer 24J could select it for the value of NLSB'. In all events, it only need be known what value will be selected to combine with the result of the XOR operation which created the value of LSB'. With this known result, a total of only two microaddresses are formed (and known) as compared to a total of four microaddresses as in the prior art.

From the above, note that system 10 also permits the unused microaddresses to be used for other circumstances.

Particularly, assuming that NLSB equals a logic 0 in the above example, then the resulting microaddresses will be:

| main portion | 0 | 0 |
OR
| main portion | 0 | 1 |

As a result, the microaddresses of:

| main portion | 1 | 0 |
AND
| main portion | 1 | 1 | are not used for purposes of accomplishing the branch for the particular example. Thus, the prior art 4-way branch is folded to a 2-way branch, and in lieu of reducing the size of microROM 12, the two additional unused microaddresses may be used by some other microprogram thread.

Having shown the present embodiment to convert a prior art 4-way branch microinstruction to a 2-way branch microinstruction, the following example illustrates operation of system 10 to convert a prior art 4-way branch microinstruction to a 3-way branch microinstruction. This operation occurs where the two different condition codes at issue ultimately require only three different target microinstructions (and hence only three different target microaddresses). Table 3 illustrates such an example:

TABLE 3

| Condition Code Alternative | Condition Code CCJ, CCI | Branch target microinstruction |
| --- | --- | --- |
| 1 | 0,0 | A |
| 2 | 0,1 | A |
| 3 | 1,0 | B |
| 4 | 1,1 | C |

Table 3 illustrates that alternatives 1 and 2 both require a first branch target microinstruction A, while alternatives 3 and 4 each require respective second and third branch target microinstructions B and C. Again, in the prior art, therefore, there are two microaddresses for target microinstruction A, a third for target microinstruction B, and a fourth for target microinstruction C. Thus, a total of four microaddresses are required and a total of four locations are consumed in the microROM. However, under the embodiment of FIG. 1 and as detailed below, system 10 reduces the example of Table 3 to only three microaddresses, thereby consuming a total of only three microROM locations and leaving a fourth microaddress unused.

Since Table 3 illustrates that only three total microaddresses are required, it is necessary to generate two bits rather than one (i.e., $2^2 > 3$ microaddresses $> 2^1$); however, one of the four combinations of those two bits will not be used as shown below. Given this conclusion, one skilled in the art will conclude that three unique bit combinations of two condition code bits can be accomplished using the logical operation shown in Table 4:

TABLE 4

| Condition Code CCJ, CCI | CCJ, CCJ AND CCI | Branch target microinstruction |
| --- | --- | --- |
| 0,0 | 0,0 | A |
| 0,1 | 0,0 | A |

TABLE 4-continued

| Condition Code CCJ, CCI | CCJ, CCJ AND CCI | Branch target microinstruction |
| --- | --- | --- |
| 1,0 | 1,0 | B |
| 1,1 | 1,1 | C |

Table 4 demonstrate that by performing the AND function between the condition codes, a result can be achieved whereby a 2-bit address (i.e., column 2) is created to form three different possibilities and, therefore, to address three different branch target microinstructions. Particularly, the second column of Table 4 lists three different addresses, each created by concatenating CCJ with the result of CCJ AND CCI. The operation of FIG. 1 in this manner is described immediately below.

Returning to FIG. 1 in view of Tables 3 and 4, above, the generation of next microaddress 16 is as follows. Again, the main portion from microinstruction 14 passes via bus 14a to next microaddress 16. Additionally, immediate fields #1 and #2 of microinstruction 14 cause multiplexers 18I and 18J to select the appropriate condition codes corresponding to Table 3. Next, multiplexers 18I and 18J output the selected condition codes to logic circuit 20 which performs the AND operation shown in Table 4. The result of the AND operation is output via output 20I to storage device 22I. Next, the LSB control field of microinstruction 14 causes multiplexer 24I to select the value from storage device 22I, while the NLSB control field of microinstruction 14 causes multiplexer 24J to select the appropriate CCJ value from its inputs. Thus, the result of the AND operation is coupled to the LSB' bit, while the value of the appropriate CCJ bit is coupled to the NLSB' bit. Accordingly, this operation is capable of outputting any of the three 2-bit combinations shown in Table 3. Note further that since the value of CCJ is desired for NLSB', an alternative to the above operation is to cause logic circuit 20 to pass this value to storage device 22J, and then to have multiplexer 24J select the output of storage device 22J and connect it to NLSB.'

From the above example pertaining to Tables 3 and 4, note that system 10 operates to leave one 2-bit combination of CCJ and CCI unused. Particularly, the combination of CCJ and CCI equal to 0,1 is never realized by combining CCI and CCJ with the recited AND logic. Thus, the microaddresses of:

|main portion|0|1| is not used for purposes of accomplishing the branch for the particular example, and may be used to simplify the microROM or as a microaddress for some other microprogram thread.

Having described the above, note further that system 10 also permits operation in the same manner as the prior art, that is, to simply pass through the values of the selected condition codes to form the last two bits of the next microaddress. Particularly, the values of the LSB and NLSB control fields are established so that the appropriate condition codes are directly selected by multiplexers 24I and 24J, respectively, and correspondingly output to LSB' and NLSB'. For example, this operation may be used where a Table such as Table 1 or 3 indicated that each of the four combinations of the relevant condition codes resulted in a different branch target microinstruction.

Figure 2:
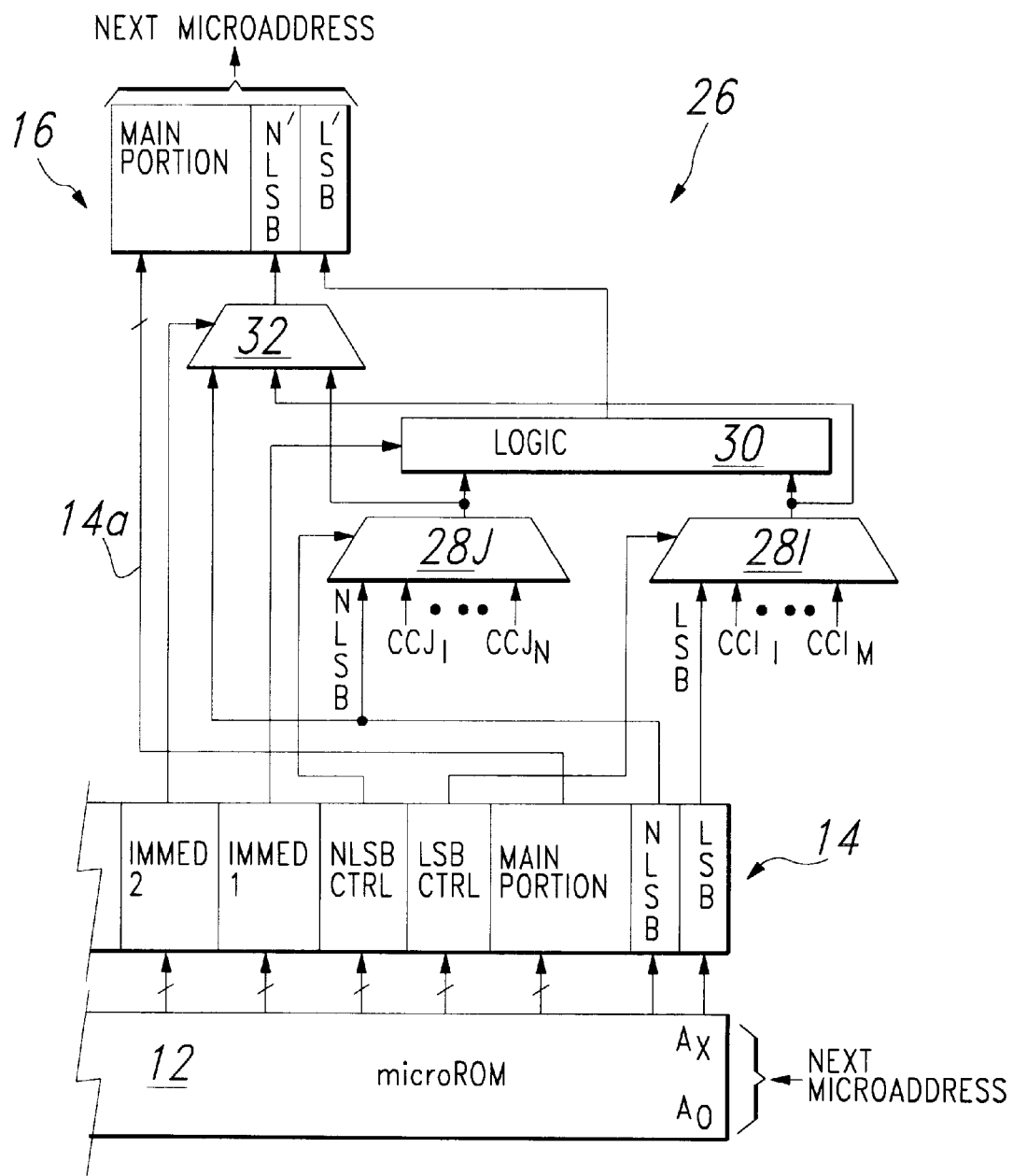
FIG. 2 illustrates a schematic of an alternative microaddress producing system.

FIG. 2 illustrates a schematic of an alternative microaddress producing system designated generally at 26. System 26, like system 10 of FIG. 1, includes a microROM 12, a microinstruction 14, and creates a next microaddress 16. The remaining alternative circuitry of FIG. 2, however, provides another embodiment for reducing inefficiencies by folding branch microaddresses in the manner described below.

Turning now to the additional circuitry of FIG. 2, system 26 includes two multiplexers 28I and 28J connected in the LSB and NLSB data paths, respectively, but in a manner differing in various respects from multiplexers 18I and 18J of FIG. 1. Turning then to multiplexer 28I, it receives as its inputs condition codes $CCI_1$ through $CCI_M$, each again depicting a changeable condition bit which, in turn, affects the next desired microinstruction. Multiplexer 28I receives as an additional input the value of LSB from microinstruction 14. The output of multiplexer 28I is connected to an input of a logic circuit 30, as well as to an input of a multiplexer 32. The control input of multiplexer 28I is connected to the LSB control field from microinstruction 14. Multiplexer 28J receives as its inputs a number, N, of condition codes $CCJ_1$ through $CCJ_N$, also representing changeable condition code bits. Multiplexer 28J receives as an additional input the value of NLSB from microinstruction 14. The output of multiplexer 28J is also connected to an input of logic circuit 30, as well as to an input of multiplexer 32. The control input of multiplexer 28J is connected to the NLSB control field from microinstruction 14.

In system 26, LSB' and NLSB' of next microaddress 16 are received from logic circuit 30 and multiplexer 32, respectively. Logic circuit 30 is a circuit constructed like logic circuit 20 of system 10, above, and operates as described below in response to control via immediate field #1. As mentioned above, one input of multiplexer 32 is connected to the output of multiplexer 28I, and a second input of multiplexer 32 is connected to the output of multiplexer 28J. Still another input of multiplexer 32 is connected to receive NLSB from microinstruction 14. Lastly, multiplexer 32 is controlled by immediate field #2.

System 26, like system 10 above, is operable to fold what was a prior art 4-way branch to a 2-way or 3-way branch. Additionally, system 26 may generate a microaddress to perform a 4-way branch in the same manner as the prior art Lastly, system 10 may generate a microaddress to perform an unconditional branch. Each of these modes of operation is described below, and again using the examples of Tables 1 through 4, above.

Recall that Tables 1 and 2 demonstrate an example of folding a prior art 4-way conditional branch into a 2-way branch. In operation, system 26 accomplishes this as follows. The microaddress main portion from microinstruction 14 passes via bus 14a directly to the corresponding portion of next microaddress 16. Multiplexers 28I and 28J are controlled by the LSB and NLSB control fields, respectively, to select the appropriate conditions codes ($CCI_1$ and $CCJ_1$ in the previous example) and output those to logic circuit 30. Logic circuit 30 is notified via immediate field #1 of the appropriate logic operation for the two given condition codes; thus, in the example from Table 2, logic circuit 30 performs an XOR operation on the selected condition codes. The result of the logic operation is output to LSB' of next microaddress 16. In the meantime, immediate field #2 causes multiplexer 32 to select the value of NLSB from microinstruction 14, and connect that value to NLSB' of next microaddress 16. Again, therefore, one skilled in the art will appreciate that the above operation reduces the amount of resulting microaddresses from four to two.

Recall that Tables 3 and 4 demonstrate an example of folding a prior art 4-way conditional branch into a 3-way branch. System 26 accomplishes this operation in either the exact same manner, or in a similar one, as the folding by system 26 of a prior art 4-way branch into a 2-way branch. Particularly, the main portion and LSB' of next microaddress are created in the same manner as above. Thus, the main portion of next microaddress 16 is from microinstruction 14, and LSB' is the result of a logic operation of the appropriate condition codes. With respect to NLSB', system 26 has two options. First, NLSB' may be created in the same manner as system 26 operates above, that is, where multiplexer 32 selects the value of NLSB from microinstruction 14. As an alternative, and indeed as would be appropriate for the examples of Tables 3 and 4, multiplexer 32 selects the appropriate condition code. In other words, Table 4 demonstrates that for the particular example given, NLSB' should be the value of the CCJ at issue. Thus, to achieve this example, immediate field #2 is set such that multiplexer 32 selects that value from the output of multiplexer 28J. Note further than in an alternative embodiment, multiplexer 32 is replaced by a second logic circuit like logic circuit 30, and the second logic circuit is also controlled to accomplish the desired logic operations and outputs. In any event, the operation of system 26 to fold a prior art 4-way branch to a 3-way branch again leaves one of four microaddresses unused and, thus, improves efficiency by twenty-five percent in the given example.

System 26 may operate to perform a 4-way branch in the prior art manner, that is, by selecting the condition codes and directing them to LSB' and NLSB'. To achieve this operation, multiplexers 28I and 28J first select those condition codes in response to the LSB and NLSB control fields. Regarding LSB', the output of multiplexer 28I is connected to logic circuit 30, which in response to immediate field #1 passes the selected condition code CCI to LSB', preferably without performing any logical operation on the condition code. Regarding NLSB', multiplexer 32 selects, in response to immediate field #2, the output of multiplexer 28J. Thus, the appropriate CCJ value is connected to NLSB'.

Lastly, system 26 may perform an unconditional branch as follows. Recall from above that, when an unconditional branch microinstruction is output as microinstruction 14, the LSB, the NLSB, and the main portion combine to form next microaddress 16. With reference now to FIG. 2 when microinstruction 14 is an unconditional branch, the LSB control field causes multiplexer 28I to connect LSB to logic circuit 30 which, in response to immediate field #1, passes the LSB directly to LSB' without changing its value. Further, immediate field #2 causes multiplexer 32 to select NLSB from its inputs, and connect it to NLSB'.

Figure 3:
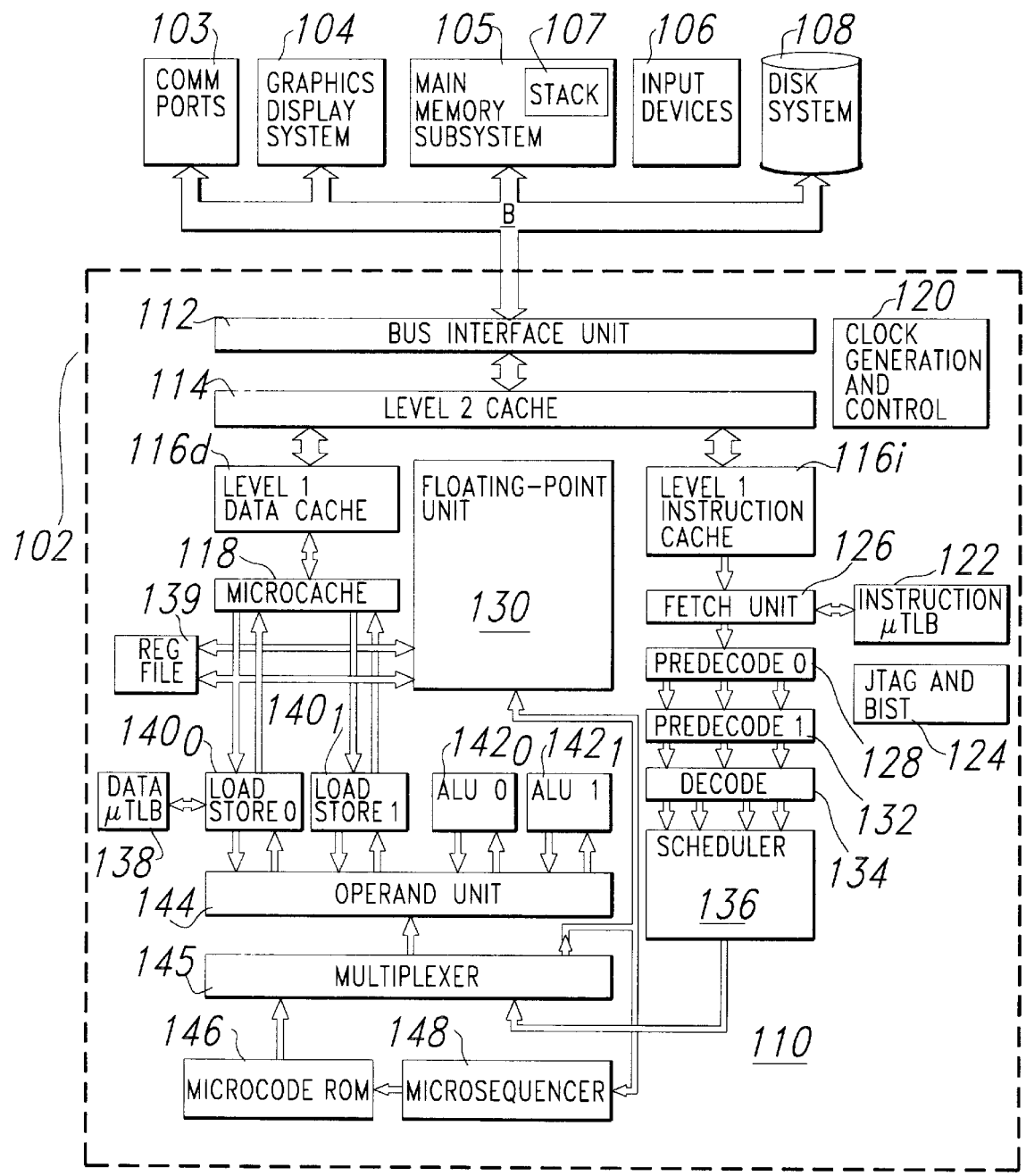
FIG. 3 illustrates a block diagram of a microprocessor embodiment into which either of the above embodiments may be incorporated.

Having described the above embodiments, FIG. 3 illustrates a block diagram of a microprocessor embodiment into which the above embodiments may be incorporated. Referring now to FIG. 3, an exemplary data processing system 102, including an exemplary superscalar pipelined microprocessor 110 within which the preferred embodiment of the invention is implemented, will be described. It is to be understood that the architecture of system 102 and of microprocessor 110 is described herein by way of example only, as it is contemplated that the present invention may be utilized in microprocessors of various architectures, with particular benefit to those of the superscalar type. It is therefore contemplated that one of ordinary skill in the art, having reference to this specification, will be readily able to implement the present invention in such other microprocessor architectures.

Microprocessor 110, as shown in FIG. 3, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM), input devices 106 (including keyboard, a pointing device, and the interface circuitry therefor), and disk system 108 (which may include hard disk drives, floppy disk drives, and CD-ROM drives). It is therefore contemplated that system 102 of FIG. 3 corresponds to a conventional desktop computer or workstation, as are now common in the art. Of course, other system implementations of microprocessor 110 can also benefit from the present invention, as will be recognized by those of ordinary skill in the art.

Microprocessor 110 includes bus interface unit 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 3, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around cache 114, by treating certain bus reads and writes as "not cacheable". Level 2 cache 114, as shown in FIG. 3, is connected to two level 1 caches 116; level 1 data cache 116$d$ is dedicated to data, while level 1 instruction cache 116$_i$ is dedicated to instructions. Power consumption by microprocessor 110 is minimized by only accessing level 2 cache 114 only in the event of cache misses of the appropriate one of the level 1 caches 116. Furthermore, on the data side, microcache 118 is provided as a level 0 cache, and in this example is a fully dual-ported cache.

As shown in FIG. 3 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_1$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple seven-stage pipeline. These stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write back: This stage stores the results of the execution in registers or in memory |

Referring back to FIG. 3, the pipeline stages noted above are performed by various functional blocks within microprocessor 110. Fetch unit 126 generates instruction addresses from the instruction pointer, by way of instruction micro-translation lookaside buffer ($\mu$TLB) 122, which translates the logical instruction address to a physical address in the conventional way, for application to level 1 instruction cache 116$_i$. Instruction cache 116$_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 3, operand unit 144 receives an input from sequencer 144 and also from microcode ROM 146, via multiplexer 145, and fetches register operands for use in the execution of the instructions. In addition, according to this example, operand unit performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multicycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 3, as well as the descriptions above such as those relating to the prior Figures, one skilled in the art may appreciate that the above embodiments may be incorporated into microprocessor 110, such as within microsequencer 148. Various related functionality may be further performed by the appropriate circuitry within FIG. 3.

From the above, it may be appreciated that the present embodiments provide numerous advantages over the prior art. As demonstrated, the above embodiments may fold a prior art 4-way branch microinstruction into either a 3-way or 2-way branch microinstruction. Indeed, note further that the above embodiments are easily modified by a person skilled in the art to handle branch scenarios greater than a 4-way branch and, thus, could operate in an 8-way branch, 16-way branch, or even greater branch scenarios. In addition, the described embodiments are operable to perform unconditional branches, or branches by concatenating condition codes with the address main portion from a given microinstruction. Still further, the various embodiments above serve to demonstrate the inventive scope, and are further subject to other alternatives described above, as well as others. For example, while the examples above depict the instance of two selected condition codes, one skilled in the art could expand the embodiments to accommodate any number of such condition codes such that two or more condition codes are selected, and the selected condition codes are coupled as operands to a logic circuit for providing a portion of the next microaddress. As another example, while the preferred microaddress portion affected by the logic result is the LSB and the NLSB, other bits could be used alternatively or in addition thereto. As still another example, while the embodiments above depict the selection of the LSB and/or the NLSB in certain circumstances, yet another embodiment could eliminate either one or both of these bits and instead substitute a known logic value (e.g., logic 0 or logic 1) in as respective condition code; in this instance, the known condition code could be selected to cause the known logic value to be included within the next microaddress. In this manner, the LSB and/or the NLSB could be eliminated altogether and the known condition code would be selected in lieu thereof. Still other examples will be apparent to a person skilled in the art. Consequently, while the present embodiments have been described in detail, various substitutions, modifications or alterations could be made to the descriptions set forth above without departing from the inventive scope which is defined by the following claims.

What is claimed is:

1. A circuit for producing a microprogram memory address, said circuit comprising:

circuitry for selecting a plurality of condition codes; and logic circuitry for producing a result by performing logic operations using as operands the selected plurality of condition codes, wherein the result forms a first portion of the microprogram memory address.

2. The circuit of claim 1 wherein the microprogram memory address is formed from a microprogram memory instruction, the microprogram memory instruction comprising an address having a next-to-least significant bit, and further comprising circuitry for selecting the next-to-least significant bit to form a second portion of the microprogram memory address.

3. The circuit of claim 2 wherein the microprogram memory instruction comprising an address further has a main portion, and further comprising circuitry for selecting the main portion from the microprogram memory instruction to form a third portion of the microprogram memory address.

4. The circuit of claim 1 wherein the plurality of selected condition codes comprise a first selected condition code and a second selected condition code, wherein said logic circuitry uses as operands the first selected condition code and the second selected condition code.

5. The circuit of claim 4 wherein the result comprises a single bit.

6. The circuit of claim 5 wherein the second selected condition code forms a second portion of the microprogram memory address.

7. The circuit of claim 4 wherein the microprogram memory address is formed from a microprogram memory instruction, the microprogram memory instruction comprising an address having a main portion, and further comprising circuitry for selecting the main portion from the microprogram memory instruction to form a second portion of the microprogram memory address.

8. The circuit of claim 4 wherein said circuitry for selecting a first condition code comprises a first multiplexer having a first plurality of condition codes connected to inputs of said first multiplexer, and wherein said circuitry for selecting a second condition code comprises a second multiplexer having a second plurality of condition codes connected to inputs of said second multiplexer, and wherein said logic circuitry is coupled to outputs of said first and second multiplexers.

9. The circuit of claim 8 and further comprising storage circuitry coupled to said logic circuitry for storing the result.

10. The circuit of claim 9 and further comprising:

a third multiplexer having inputs, a first of said inputs coupled to receive a first output from said storage circuitry, a second of said inputs coupled to receive a first selected bit of a microprogram memory instruction, and a plurality of said inputs coupled to receive respective condition codes, said third multiplexer further having an output for outputting the first portion of the microprogram memory address; and a fourth multiplexer having inputs, a first of said inputs coupled to receive a second output from said storage circuitry, a second of said inputs coupled to receive a second selected bit of the microprogram memory instruction, and a plurality of said inputs coupled to receive respective condition codes, said fourth multiplexer further having an output for outputting a second portion of the microprogram memory address.

11. The circuit of claim 10 wherein the first selected bit comprises a least significant bit of the microprogram memory instruction, and wherein the second selected bit comprises a next-to-least significant bit of the microprogram memory instruction.

12. The circuit of claim 4:

wherein said circuitry for selecting the first condition code comprises a first multiplexer having inputs, a first of said inputs coupled to receive a first selected bit from a microprogram memory instruction, and a plurality of said inputs coupled to receive respective condition codes, said first multiplexer further having an output coupled to said logic circuitry; and wherein said circuitry for selecting the second condition code comprises a second multiplexer having inputs, a first of said inputs coupled to receive a second selected bit from the microprogram memory instruction, and a plurality of said inputs coupled to receive respective condition codes, said second multiplexer further having an output coupled to said logic circuitry.

13. The circuit of claim 12 wherein the first selected bit comprises a least significant bit of the microprogram memory instruction, and wherein the second selected bit comprises a next-to-least significant bit of the microprogram memory instruction.

14. The circuit of claim 12 and further comprising a third multiplexer having inputs, a first of said inputs coupled to the output of said first multiplexer, a second of said inputs coupled to the output of said second multiplexer, and a third of said inputs coupled to the second selected bit from the microprogram memory instruction, and wherein the output of said third multiplexer is operable to output a second portion of the microprogram memory address.

15. The circuit of claim 14 wherein the first selected bit comprises a least significant bit of the microprogram memory instruction, and wherein the second selected bit comprises a next-to-least significant bit of the microprogram memory instruction.

16. A processor, comprising:
a microprogram memory for outputting a microprogram memory instruction in response to a microprogram memory address;
a circuit for producing the a microprogram memory address, said circuit comprising:
circuitry for selecting a plurality of condition codes; and
logic circuitry for producing a result by performing logic operations using as operands the selected plurality of condition codes, wherein the result forms a first portion of the microprogram memory address.

17. The processor of claim 16 wherein the microprogram memory address is formed from a microprogram memory instruction, the microprogram memory instruction comprising an address having a next-to-least significant bit, and further comprising circuitry for selecting the next-to-least significant bit to form a second portion of the microprogram memory address.

18. The processor of claim 17 wherein the microprogram memory instruction comprising an address further has a main portion, and further comprising circuitry for selecting the main portion from the microprogram memory instruction to form a third portion of the microprogram memory address.

19. The processor of claim 16 wherein the plurality of selected condition codes comprise a first selected condition code and a second selected condition code, wherein said logic circuitry uses as operands the first selected condition code and the second selected condition code.

20. The processor of claim 19 wherein the result comprises a single bit.

21. The processor of claim 20 wherein the second selected condition code forms a second portion of the microprogram memory address.

22. The processor of claim 19 wherein the microprogram memory address is formed from a microprogram memory instruction, the microprogram memory instruction comprising an address having a main portion, and further comprising circuitry for selecting the main portion from the microprogram memory instruction to form a second portion of the microprogram memory address.

23. The processor of claim 19 wherein said circuitry for selecting a first condition code comprises a first multiplexer having a first plurality of condition codes connected to inputs of said first multiplexer, and wherein said circuitry for selecting a second condition code comprises a second multiplexer having a second plurality of condition codes connected to inputs of said second multiplexer, and wherein said logic circuitry is coupled to outputs of said first and second multiplexers.

24. The processor of claim 23 and further comprising storage circuitry coupled to said logic circuitry for storing the result.

25. The processor of claim 24 and further comprising:
a third multiplexer having inputs, a first of said inputs coupled to receive a first output from said storage circuitry, a second of said inputs coupled to receive a first selected bit of a microprogram memory instruction, and a plurality of said inputs coupled to receive respective condition codes, said third multiplexer further having an output for outputting the first portion of the microprogram memory address; and
a fourth multiplexer having inputs, a first of said inputs coupled to receive a second output from said storage circuitry, a second of said inputs coupled to receive a second selected bit of the microprogram memory instruction, and a plurality of said inputs coupled to receive respective condition codes, said fourth multiplexer further having an output for outputting a second portion of the microprogram memory address.

26. The processor of claim 25 wherein the first selected bit comprises a least significant bit of the microprogram memory instruction, and wherein the second selected bit comprises a next-to-least significant bit of the microprogram memory instruction.

27. The processor of claim 19:
wherein said circuitry for selecting the first condition code comprises a first multiplexer having inputs, a first of said inputs coupled to receive a first selected bit from a microprogram memory instruction, and a plurality of said inputs coupled to receive respective condition codes, said first multiplexer further having an output coupled to said logic circuitry; and
wherein said circuitry for selecting the second condition code comprises a second multiplexer having inputs, a first of said inputs coupled to receive a second selected bit from the microprogram memory instruction, and a plurality of said inputs coupled to receive respective condition codes, said second multiplexer further having an output coupled to said logic circuitry.

28. The processor of claim 27 wherein the first selected bit comprises a least significant bit of the microprogram memory instruction, and wherein the second selected bit comprises a next-to-least significant bit of the microprogram memory instruction.

29. The processor of claim 27 and further comprising a third multiplexer having inputs,
a first of said inputs coupled to the output of said first multiplexer, a second of said inputs coupled to the output of said second multiplexer, and a third of said inputs coupled to the second selected bit from the microprogram memory instruction, and wherein the output of said third multiplexer is operable to output a second portion of the microprogram memory address.

30. The processor of claim 29 wherein the first selected bit comprises a least significant bit of the microprogram memory instruction, and wherein the second selected bit comprises a next-to-least significant bit of the microprogram memory instruction.

31. A microprocessor-based computer system, comprising:

an input device;

a display system;

a main memory; and a microprocessor, coupled to the input device, display system and main memory, and comprising:
- a microprogram memory for outputting a microprogram memory instruction in response to a microprogram memory address;
- a circuit for producing the microprogram memory address, said circuit comprising:
  - circuitry for selecting a plurality of condition codes; and
  - logic circuitry for producing a result by performing logic operations using as operands the selected plurality of condition codes, wherein the result forms a first portion of the microprogram memory address.

32. The computer system of claim 31 wherein the microprogram memory address is formed from a microprogram memory instruction, the microprogram memory instruction comprising an address having a next-to-least significant bit, and further comprising circuitry for selecting the next-to-least significant bit to form a second portion of the microprogram memory address.

33. The computer system of claim 31 wherein the microprogram memory instruction comprising an address further has a main portion, and further comprising circuitry for selecting the main portion from the microprogram memory instruction to form a second portion of the microprogram memory address.

34. The computer system of claim 31 wherein the plurality of selected condition codes comprise a first selected condition code and a second selected condition code, wherein said logic circuitry uses as operands the first selected condition code and the second selected condition code.

35. A method of producing a microprogram memory address, comprising the steps of:

selecting a plurality of condition codes; and producing a result by performing logic operations using as operands the selected plurality of condition codes, wherein the result forms a first portion of the microprogram memory address.

36. The method of claim 35 wherein the microprogram memory address is formed from a microprogram memory instruction, the microprogram memory instruction comprising an address having a next-to-least significant bit, and further comprising the step of selecting the next-to-least significant bit to form a second portion of the microprogram memory address.

37. The method of claim 35 wherein the microprogram memory instruction comprising an address further has a main portion, and further comprising the step of selecting the main portion from the microprogram memory instruction to form a second portion of the microprogram memory address.

38. The method of claim 35 wherein the plurality of selected condition codes comprise a first selected condition code and a second selected condition code, wherein said step of producing a result by performing logic operations using as operands the selected plurality of condition codes comprises performing logic operations using as operands the first selected condition code and the second selected condition code.

* * * * *